Feb. 14, 1967 B. L. STRATTON ETAL 3,304,439

FREQUENCY MULTIPLYING MONOSTABLE MULTIVIBRATOR

Filed Dec. 26, 1963

BOYD L. STRATTON &
BARRETT E. GUISINGER
INVENTORS

BY James H. Griffin
ATTORNEY 3,304,439

FREQUENCY MULTIPLYING MONOSTABLE MULTIVIBRATOR

Boyd L. Stratton, Woodside, and Barrett E. Guisinger, Redwood City, Calif., assignors to Ampex Corporation, Redwood City, Calif., a corporation of California Filed Dec. 26, 1963, Ser. No. 333,434
8 Claims. (Cl. 307—88.5)

This invention relates to frequency multiplication circuits and more particularly to circuits for the frequency multiplication of non-sinusoidal pulses.

Circuitry for doubling or producing other multiples of an input pulse, usually employing the monostable multivibrator principle, appears in radar systems, television systems, tape recorders and wherever some input signal is the time basis for a number of trigger or gating pulses. Most doubling circuits in the past have been limited to operating only with sinusoidal waveforms. Moreover, there has been a constant problem with the regularity and symmetry of the output waves. This regularity and symmetry problem is accentuated when the input frequency varies, as is often the case with inputs taken from sensors or revolving mechanical devices such as magnetic tape recorder heads.

It is, therefore, the general object of this invention to provide an improved linear interpolator or frequency multiplication circuit.

Another object of this invention is to provide a pulse multiplication circuit that does not require conversion of all inputs to sinusoidal waveforms.

Another object is to provide a pulse multiplication circuit that can properly position the output pulses generated.

Another object is to provide a pulse multiplication circuit that can produce output waves symmetrical within ±5%.

Another object is to provide a pulse multiplication circuit that is adjustable in such manner that its output waves can be varied ±75% from an evenly spaced position.

Another object is to provide a pulse multiplication circuit that can operate with any input frequency from 500 p.p.s. to 500,000 p.p.s.

In the accomplishment of these objects, applicants' invention begins with the conventional monostable multivibrator. The practice of applicants' invention permits the input thereto to be any type of waveform, sinusoidal or non-sinusoidal. Though the output of the multivibrator is, as in the past, the output of the entire frequency multiplication circuit, it is also fed back through correction circuitry to alter the time constant of the monostable multivibrator.

It is a feature of applicants' invention that the output of the monostable multivibrator appears as the input of a position detector circuit, wherein it is processed to produce an error signal representing the degree of its asymmetry or irregularity.

It is another feature of applicants' invention that signals in the position detector circuit act upon a normally balanced circuit designed to be unbalanced by a deviant signal and thus to alter its output.

As another feature of applicants' invention, the altered output of the position detector circuit is directed to an active element in the timing circuit of the monostable, altering the circuit behavioral characteristics of this active element in such a way that the time constant of the monostable multivibrator is shifted to produce the desired symmetry and regularity of output wave.

The above and other objects and features of this invention and a better understanding thereof may be had by referring to the following detailed description and claims, together with the accompanying drawings, in which:

Figure 1:
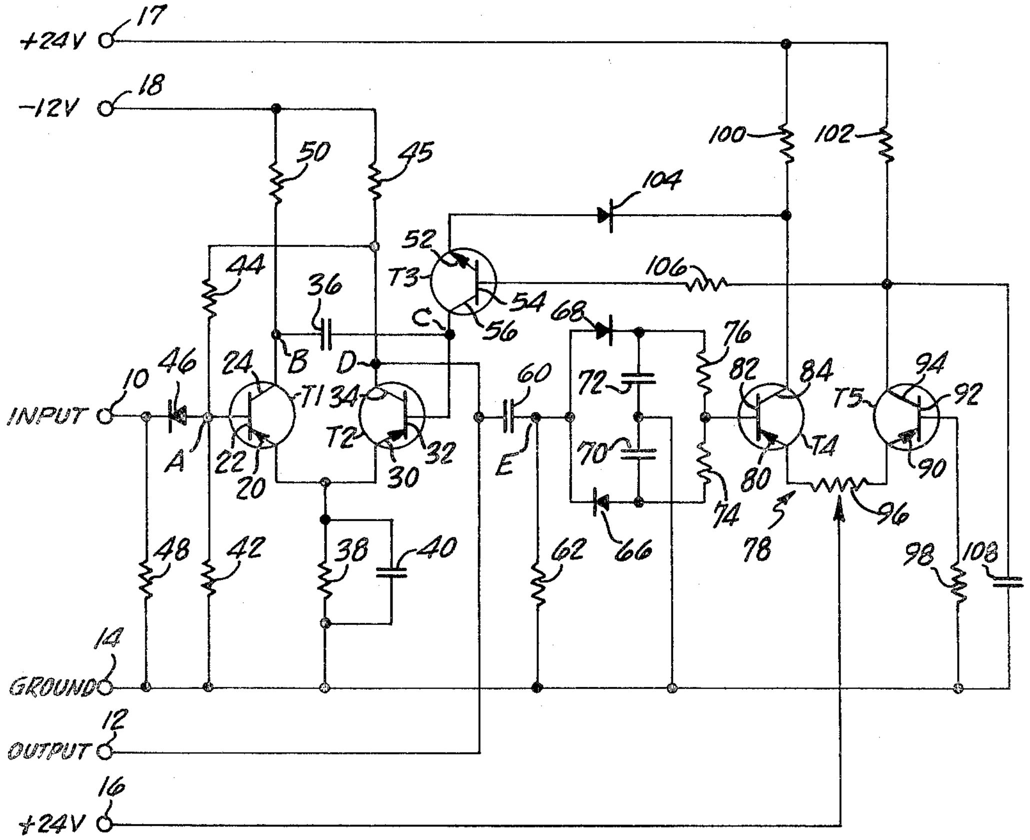
FIGURE 1 is a schematic of the circuitry of a preferred embodiment of applicants' invention.

Referring to FIGURE 1, a preferred embodiment of applicants' invention has an input terminal 10, an output terminal 12, a ground terminal 14, and power supply terminals 16, 17 and 18, shown here as +24, −24, and −12 v., respectively, with respect to ground. Two transistors T1, T2, having emitters 20, 30, bases 22, 32, and collectors 24, 34, respectively, form the basic multivibrator circuit, together with a capacitor 36. The emitters 20 and 30 are coupled to ground through a stabilizing resistor 38 with a by-pass capacitor 40 in parallel therewith. The base 22 is coupled to ground 14 through a resistor 42 and is coupled to the power supply 18, through resistors 44, 45. Signals at the input terminal 10 are applied to the base 22 through a diode 46 and portions of the signals blocked by the diode 46 pass to ground through a resistor 48. The collector 24 of the transistor T1 is coupled to the power supply 18 through a resistor 50. The collector 34 of the transistor T2 is directly connected to the output terminal 12 and to the junction between resistors 44 and 45.

It is usual in monostable or "one shot" multivibrators to couple the output electrode of one active element to the control electrode of the other active element through a resistance-capacitance time constant circuit, and the capacitor 36 between the collector 24 of the transistor T1 and the base 32 of the transistor T2 represents the conventional capacitance portion. The resistance portion of the multivibrator time constant circuit has been replaced, however, by a transistor T3, having an emitter 52, base 54, and collector 56, the collector 56 being directly coupled to the base 32 and the capacitor 36.

A capacitor 60 is connected at one end to the collector 34 from which the output of the circuit is taken. The other end of the capacitor 60 is coupled to ground through a resistor 62 and also to two rectifiers 66, 68 of opposite direction. Two capacitors 70, 72 appear between the other ends of the rectifiers 66, 68 and ground 12. Two resistors 74, 76 are also connected to the other ends of the rectifiers 66, 68 and are coupled to each other at the input terminal of a balanced circuit 78.

The balanced circuit 78 consists of two transistors T4, T5, having emitters 80, 90, bases 82, 92 and collectors 84, 94. The emitters 80, 90 are coupled together across an adjustment potentiometer 96, having its movable contact connected through the resistor 97 to the power supply 16. The base 92 of the transistor T5 is grounded through a resistor 98. The collectors 84, 94 are connected to the power supply 17 through resistors 100, 102.

The collector 84 of the transistor T4 is coupled to the emitter 52 of the transistor T3 through a diode 104. The collector 94 of the transistor T5 is coupled to the base 54 of the transistor T3 through a resistor 106 and to the ground terminal 12 through a capacitor 108.

Figure 2:
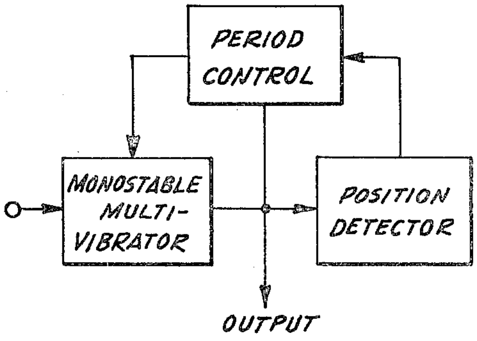
FIGURE 2 is a block diagram thereof.

Referring to FIGURE 2, the above described circuit can be seen to consist of three subsystems: the monostable itself, the position detector (the elements from the capacitor 60 through the balanced circuit 78), and the period control (the transistor T3). The position detector has for its input the output of the overall frequency multiplication circuit; this output evaluates and processes into a signal that, when applied to the period control, will result in the period or time constant of the multivibrator being maintained at or returned to its desired value. The transistor T3, substituted for the usual resistor found in conventional multivibrators, is itself a resistance element, but variable and electronically controllable; it exercises period control by varying the R-C time constant of the multivibrator in response to the multivibrator's own output signal, as reconstituted by the position detector.

In the operation of the above-described pulse multiplier, the stable condition of the multivibrator portion of the circuit is such that the transistor T1 is cut off and the transistor T2 is conducting. Since no current is able to flow through the resistor 50, the voltage at the collector 24 is that of the power supply 18. On the opposite side of the capacitor 36, the voltage of the base 32 and the collector 34 (and thus the output terminal 12) while T2 is conducting is that of the joined emitters 20, 30—very near zero. The capacitor 36 is charged and has a certain voltage across it.

Figure 3:
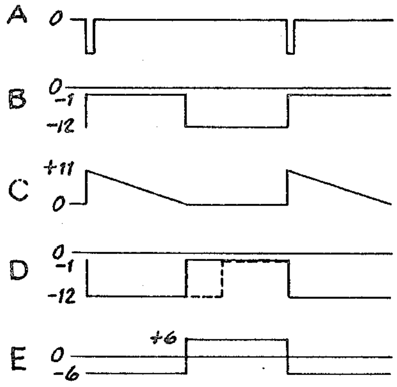
FIGURE 3 is a graph of the waveforms at selected points in the preferred circuit.

The input signal applied to the base 22 of the transistor T1 (FIGURE 3, A) saturates the transistor T1, so that the voltage at its collector 24 is suddenly equalized with the voltage at its emitter 20, a rise from the voltage of the power supply 18 almost to zero. Thus, the voltage at the T1 side of the capacitor 36 rises substantially (FIGURE 3, B).

Since the voltage drop across the capacitor 36 cannot change instantaneously, the voltage at its other end, on the base 32 of the transistor T2 (FIGURE 3, C), rises initially by the same amount as the voltage at the collector 24. Since this cuts off the transistor T2, the voltage at its collector 34 which is the output signal of the pulse multiplier circuit (FIGURE 3, D), drops to the voltage of the power supply 18. The output signal at 14 remains at this value until the transistor T2 begins to conduct again, at which time the output signal returns to the voltage of the joined emitters 20, 30.

Once the transistor T2 cuts off current from the power supply 18 through the resistor 45, this current is diverted to a path to ground through the resistor 44, thus tending to hold the transistor T2 in the conductive state. Meanwhile, the capacitor 36 is charging through the transistor T3, causing the high voltage at the base 32 of the transistor T2 to degenerate; when this base voltage reaches a value just below zero, the transistor T2 will return to the conductive state and the output signal will return to a value near that of the emitters 20, 30.

The length of time that the transistor T2 is non-conductive depends on the time required for the capacitor 36 to return the voltage of the base 32 to the point where the transistor T2 is again forward biased. Since the capacitor 36 is dependent on the transistor T3 for its charging current, the signal applied to the base 54 is the ultimate governor of the conductive and cut-off states of the transistors T1 and T2. The source of this signal is the collector 94 of the transistor T5.

The signal at the collector 94 is the output of the position detector portion of applicants' pulse multiplier; the input is the signal at the collector 34 which, in crossing the capacitor 60, is shifted to a zero center reference to be applied across the rectifiers 66, 68 (FIGURE 3, E). The pulses pass through the rectifier 66, the filtering capacitor 70, and the resistor 74 or they pass through the rectifier 68, the filtering capacitor 72, and the resistor 76, depending on whether they are positive or negative. The filtered pulses, forming essentially the integral of the signal at the collector 34, are applied to the base 82, and if the output waveform (FIGURE 3, D) is symmetrical, will offset each other to produce zero voltages. If the output waveform deviates from the symmetrical, the filtered pulses will unablance and will cause a voltage change at the base 82 which will vary the current flow through the transistor T4, thus causing shifts in the voltages on the electrodes 90, 94 of the transistor T5. The voltage at the collector 94, of course, is applied across the resistor 106 to the control element 54 of the transistor T3 to vary the charging time of the capacitor 36. According to the setting of the adjustment potentiometer 96, the balanced circuit 78 can maintain the capacitor 36-transistor T3 time constant at such a point as to produce a symmetrical waveform at the collector 34 (FIGURE 3, D, solid line) or an asymmetrical waveform (FIGURE 3, D, dotted line).

A pulse multiplier in accordance with the foregoing description and drawing was built and operated using the following components:

| | |
|---|---|
| Voltages: | |
| **16** v. | +24 |
| **17** v. | −24 |
| **18** v. | −12 |
| Transistors: | |
| T1 | 2N1122A |
| T2 | 2N1122A |
| T3 | 2N706 |
| T4 | 2N404 |
| T5 | 2N404 |
| Diodes: | |
| **46** | 1N281 |
| **66** | 1N281 |
| **68** | 1N281 |
| **104** | 1N281 |
| Resistors: | Ohms |
| **38** | 100 |
| **42** | 12K |
| **44** | 12K |
| **45** | 1K |
| **48** | 200 |
| **50** | 1K |
| **62** | 200 |
| **74** | 47K |
| **76** | 47K |
| **96** | 250 |
| **98** | 47K |
| **100** | 2K |
| **102** | 2K |
| **106** | 150 |
| Capacitors: | Mf. |
| **36** | .015 |
| **40** | 1.0 |
| **60** | 1.0 |
| **70** | 10 |
| **72** | 10 |
| **108** | 10 |

This above-specified circuit has been found capable of varying pulses ±75% from the evenly spaced position with error less than ±2½%, over the 500 p.p.s. to 500,000 p.p.s. range. Thus, applicant has provided an improved linear interpolator or frequency multiplication circuit that operates on nonsinusoidal as well as sinusoidal waveforms and properly positions the output pulses generated, symmetrically or otherwise, according to the setting of the adjustment potentiometer 96.

A number of alternative arrangements will suggest themselves to those skilled in the art. For example, NPN conductivity type transistors could be replaced with PNP conductivity type, and vice versa, if only the bias voltages are reversed. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. In a monostable multivibrator circuit for converting an input waveform into doubled output waveforms including first and second active elements each having control and output electrodes, means for applying said input waveform to the control electrode of said first active element, a capacitor coupled between the output electrode of the first active element and the control electrode of the second active element, and an output terminal coupled to the output electrode of the second active element, the combination comprising a third active element coupled to the capacitor, integrating means coupled to the output terminal for producing a signal that is the integral of the output of the monostable multivibrator circuit, and means coupled between the integrating means and the third active element for converting the integral into an error signal proportional to departures of said integral from a predetermined reference and applying the error signal to the third active element to alter the resistance thereof to vary the time constant of the monostable multivibrator to produce the desired waveforms or symmetry in the doubled output waveforms.

2. In a monostable multivibrator circuit for converting an input waveform into doubled output waveforms including first and second active elements each having control and output electrodes, means for applying said input waveform to the control electrode of said first active element, a capacitor coupled between the output electrode of the first active element and the control electrode of the second active element, and an output terminal coupled to the output electrode of the second active element, the combination comprising a third active element coupled to the capacitor, integrating means coupled to the output terminal for producing a signal that is the integral of the output of the monostable multivibrator circuit, control means coupled between the integrating means and the third active element for converting the integral into a control signal applied to the third active element to alter the resistance of the third active element and thus the time constant of the monostable multivibrator to produce the desired waveforms or symmetry in the doubled output waveforms, and adjustment means incorporated in the control means for varying the symmetry of the waveforms appearing at the output terminal.

3. In a monostable multivibrator circuit for converting an input waveform into doubled output waveforms including first and second active elements each having control and output electrodes, means for applying said input waveform to the control electrode of said first active element, a capacitor coupled between the output electrode of the first active element and the control electrode of the second active element, and an output terminal coupled to the output electrode of the second active element, the combination comprising a third active element coupled to the capacitor, a blocking capacitor coupled to the output terminal, two rectifying means coupled to the blocking capacitor, said rectifying means being oppositely poled with respect to and coupled in parallel with each other, and control means coupled between the rectifying means and the third active element for converting the signals from the rectifying means into a signal to be applied to the third active element to alter the resistance of the third active element and the time constant of the monostable multivibrator to produce the desired waveforms or symmetry in the doubled output waveforms.

4. In a monostable multivibrator circuit for converting an input waveform into doubled output waveforms including first and second active elements each having control and output electrodes, means for applying said input waveform to the control electrode of said first active element, a capacitor coupled between the output electrode of the first active element and the control electrode of the second active element, and an output terminal coupled to the output electrode of the second active element, the combination comprising a third active element coupled to the capacitor, integrating means coupled to the output terminal for producing a signal that is the integral of the output of the monostable multivibrator circuit, and a differential amplifier coupled between the integrating means and the third active element for converting the integral into a signal to be applied to the third active element to alter the resistance of the third active element and thus the time constant of the monostable multivibrator to produce the desired waveshape or symmetry in the doubled output waveforms.

5. In a monostable multivibrator circuit for converting an input waveform into doubled output waveforms including first and second active elements each having control and output electrodes, means for applying said input waveform to the control electrode of said first active element, a capacitor coupled between the output electrode of the first active element and the control electrode of the second active element, and an output terminal coupled to the output electrode of the second active element, the combination comprising a third active element coupled to the capacitor, integrating means coupled to the output terminal for producing a signal that is the integral of the output of the monostable multivibrator circuit, a differential amplifier coupled between the integrating means and the third active element for converting the integral into a signal to be applied to the third active element to alter the resistance of the third active element and thus the time constant of the monostable multivibrator to produce the desired waveforms or symmetry in the doubled output waveforms, and an adjustment potentiometer incorporated in the differential amplifier for varying the symmetry of the waveforms appearing at the output terminal.

6. In a monostable multivibrator circuit for converting an input waveform into doubled output waveforms including first and second active elements each having control and output electrodes, means for applying said input waveform to the control electrode of said first active element, a capacitor coupled between the output electrode of the first active element and the control electrode of the second active element, and an output terminal coupled to the output electrode of the second active element, the combination comprising a third active element coupled to the capacitor, a blocking capacitor coupled to the output terminal, two rectifying means coupled to the blocking capacitor, said rectifying means being oppositely poled with respect to and coupled in parallel with each other, and a differential amplifier coupled between the rectifying means and the third active element.

7. In a monostable multivibrator circuit for converting an input waveform into doubled output waveforms including first and second active elements each having control and output electrodes, means for applying said input waveform to the control electrode of said first active element, a capacitor coupled between the output electrode of the first active element and the control electrode of the second active element, and an output terminal coupled to the output electrode of the second active element, the combination comprising a third active element coupled to the capacitor, a blocking capacitor coupled to the output terminal, two rectifying means coupled to the blocking capacitor, said rectifying means being oppositely poled with respect to and coupled in parallel with each other, a differential amplifier coupled between the rectifying means and the third active element, and an adjustment potentiometer incorporated in the differential amplifier.

8. A wave doubling circuit comprising: a first transistor having emitter, base, and collector electrodes, means for applying an input signal to be doubled to the base electrode of said first transistor, a first capacitor coupled to said collector electrode of said first transistor, a first resistor coupled between said collector electrode and a voltage source, a second transistor having emitter, base, and collector electrodes, the emitter electrode of said second transistor being joined to the emitter electrode of said first transistor and being indirectly coupled to ground, the base electrode of said second transistor being coupled to said first capacitor and the collector electrode of said second transistor being coupled through a second resistor to said voltage source, a third transistor having first and second electrodes and a control element, said first electrode of said third transistor being coupled to the base electrode of said second transistor, a differential amplifier including fourth and fifth transistors each having emitter, base, and collector electrodes, said collector electrodes of said fourth and fifth transistors being coupled through third and fourth resistors to said voltage source, said base electrode of said fifth transistor coupled to a source of reference potential, an adjustment potentiometer coupled between said emitter electrodes of said fourth and fifth transistors and having a movable contact coupled to said voltage source, means coupling said second electrode of said third transistor to the collector of said fourth transistor, means coupling said control element of said third transistor to the collector of said fifth transistor, a second capacitor coupled to the collector electrode of said second transistor, a fifth resistor coupled between said second capacitor and ground, two diodes connected to said second capacitor in oppositely poled parallel relation with each other, filters coupled between said diodes and ground, and sixth and seventh resistors connected between said diodes and the base electrode of said fourth transistor.

References Cited by the Examiner

UNITED STATES PATENTS

| | | | |
|---|---|---|---|
| 2,837,663 | 6/1958 | Walz | 307—88.5 |
| 2,976,432 | 3/1961 | Geckle | 307—88.5 |
| 3,051,850 | 8/1962 | Abbott et al. | 307—88.5 |
| 3,113,219 | 12/1963 | Gilmore | 307—88.5 |
| 3,184,604 | 5/1965 | Hale | 307—88.5 |
| 3,200,263 | 8/1965 | Zenzefilis | 307—88.5 |

ARTHUR GAUSS, *Primary Examiner.*

S. D. MILLER, *Assistant Examiner.*